(12) United States Patent
Bruchmann et al.

(10) Patent No.: US 7,521,521 B2
(45) Date of Patent: Apr. 21, 2009

(54) HIGHLY FUNCTIONAL HIGHLY BRANCHED OR HYPERBRANCHED POLYCARBONATES AND THE PRODUCTION AND USE HEREOF

(75) Inventors: Bernd Bruchmann, Freinsheim (DE); Jean-Francois Stumbe, Strasbourg (FR); Joelle Bédat, Offendorf (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 284 days.

(21) Appl. No.: 10/571,691

(22) PCT Filed: Sep. 4, 2004

(86) PCT No.: PCT/EP2004/009874

§ 371 (c)(1),
(2), (4) Date: Mar. 13, 2006

(87) PCT Pub. No.: WO2005/026234

PCT Pub. Date: Mar. 24, 2005

(65) Prior Publication Data

US 2007/0037957 A1 Feb. 15, 2007

(30) Foreign Application Priority Data

Sep. 12, 2003 (DE) ................. 103 42 523

(51) Int. Cl.
*C08G 64/00* (2006.01)

(52) U.S. Cl. .............. 528/196; 156/230; 156/241; 524/501; 524/502; 524/515; 524/591; 525/437; 528/198

(58) Field of Classification Search ........... 156/230, 156/241; 524/501, 502, 515, 591; 525/437; 528/196, 198
See application file for complete search history.

(56) References Cited

U.S. PATENT DOCUMENTS

| | | |
|---|---|---|
| 3,305,605 A | 2/1967 | Hostettler et al. |
| 4,255,301 A | 3/1981 | Minagawa et al. |
| 4,533,729 A | 8/1985 | Newland et al. |
| 4,808,691 A | 2/1989 | Konig et al. |
| 5,116,929 A | 5/1992 | Greco et al. |
| 5,952,450 A | 9/1999 | Ishihara et al. |
| 5,955,687 A * | 9/1999 | Miyagi et al. ............ 84/97 |
| 6,025,405 A * | 2/2000 | Snell Tung et al. ........ 521/138 |
| 6,156,919 A | 12/2000 | Langer et al. |
| 6,646,100 B2 | 11/2003 | Hofmann et al. |
| 6,818,784 B2 | 11/2004 | Tillack et al. |
| 2004/0097684 A1 | 5/2004 | Bruchmann et al. |

FOREIGN PATENT DOCUMENTS

| | | |
|---|---|---|
| DE | 34 18 092 A1 | 11/1985 |
| DE | 101 30 882 A1 | 1/2003 |
| DE | 101 38 216 A1 | 2/2003 |
| DE | 101 47 712 A1 | 4/2003 |
| EP | 0 292 772 B1 | 11/1988 |
| EP | 0 364 052 B1 | 4/1990 |
| EP | 0 896 013 A1 | 2/1999 |
| EP | 1 018 504 B1 | 7/2000 |
| FR | 2 010 777 | 2/1970 |
| WO | WO-98/50453 A1 | 11/1998 |
| WO | WO-02/26697-A2 A3 | 4/2002 |
| WO | WO-02/36695 A1 | 5/2002 |
| WO | WO-03/029240 A1 | 4/2003 |

OTHER PUBLICATIONS

Hölter et al., 1997. "Degree of branching in hyperbranched polymers," *Acta Polymer*, 48, pp. 30-35.

Floryl, 2000. "Controlling the Growth of Polymer Trees: Concepts and Perspectives For Hyperbranched Polymers" *Chem. Eur. J*, 6, No. 14, pp. 2499-2505.

Flory, "Molecular Size Distribution in Three Dimensional Polymers. VI. Branched Polymers Containing A-R-$B_f$-1 Type Units." *J. Am. Chem. Soc.*, pp. 2718-2723, Jun. 5, 1952.

Rannard, Steve P., 2000. "A Highly Selective, One-Pot Multiple-Addition Convergent Synthesis of Polycarbonate Dendrimers" *J. Am. Chem. Soc.*, 122, pp. 11729-11730.

"Polycarbonates," 2000. Ullmann's Encyclopedia of Industrial Chemistry, Sixth Edition, 2000 Electronic Release.

Becker/Braun, Kunstoff-Handbuch, 1992. "Chemischer Aufbau," *Bd. 3/1, Polyacetale, Polyester, Celluloseester, Carl-Hanser-Verlag, Munchen*, 1992, Seiten 118-119.

Bolton, Daniel, 1997. "Synthesis and Characterization of Hyperbranched Polycarbonates," *Macromolecules*, 30, pp. 1890-1896.

* cited by examiner

*Primary Examiner*—Terressa M Boykin
(74) *Attorney, Agent, or Firm*—Connolly Bove Lodge & Hutz LLP

(57) ABSTRACT

High-functionality highly or hyper-branched polycarbonates based on dialkyl or diaryl carbonates and on aliphatic diol or polyols, processes for preparing them, and their use for preparing printing inks.

20 Claims, No Drawings

HIGHLY FUNCTIONAL HIGHLY BRANCHED OR HYPERBRANCHED POLYCARBONATES AND THE PRODUCTION AND USE HEREOF

This application is a National Stage of PCT/EP2004/009874 filed Sept. 4, 2004 which in turn claims priority from German Application 10342523.3, filed Sept. 12, 2003.

The present invention relates to high-functionality highly or hyper-branched polycarbonates based on dialkyl or diaryl carbonates or phosgene, diphosgene or triphosgene and on aliphatic, aliphatic/aromatic and aromatic dials or polyols, to a process for preparing them, and to their use for preparing printing inks.

The high-functionality highly or hyper-branched polycarbonates of the invention can be put to advantageous industrial use as, for instance, adhesion promoters or thixotropic agents or as building blocks for preparing polyaddition or polycondensation polymers: paints, coatings, adhesives, sealants, casting elastomers or foams, for example.

Polycarbonates are customarily obtained from the reaction of alcohols or phenols with phosgene or from the transesterification of alcohols or phenols with dialkyl or diaryl carbonates. Industrial significance is possessed by aromatic polycarbonates, prepared for example from bisphenols; the role played by aliphatic polycarbonates has to date been minor in terms of market volume. On this subject see also Becker/Braun, Kunststoff-Handbuch Vol. 3/1, Polycarbonates, Polyacetals, Polyesters, Cellulose esters, Carl-Hanser-Verlag, Munich 1992, pages 118-119 and "Ullmann's Encyclopedia of Industrial Chemistry", 6th Edition, 2000 Electronic Release, Verlag Wiley-VCH.

The aromatic or aliphatic polycarbonates described in the literature are generally linear in construction or else have been synthesized with a low degree of branching.

For instance, U.S. Pat. No. 3,305,605 describes the use of solid linear aliphatic polycarbonates having a molar mass of more than 15000 Da as plasticizers for polyvinyl polymers.

U.S. Pat. No. 4,255,301 describes linear cycloaliphatic polycarbonates as light stabilizers for polyesters.

Linear aliphatic polycarbonates are also used with preference for preparing thermoplastics, for polyesters for example or for polyurethane elastomers or polyurea-urethane elastomers: see also EP 364052, EP 292772, EP 1018504 or DE 10130882. A general characteristic of these linear polycarbonates is their high intrinsic viscosity.

EP-A 896 013 discloses crosslinked polycarbonates which are obtainable by reacting mixtures of diols and polyols having at least 3 OH groups with organic carbonates, phosgenes or derivatives thereof. Preferably at least 40% of the diol is used. The publication contains no references whatsoever as to how, starting from the stated starting products, it might also be possible to prepare non-crosslinked, hyperbranched polycarbonates.

High-functionality polycarbonates of defined construction are a more recent phenomenon.

S. P. Rannard and N. J. Davis, in J. Am. Chem. Soc. 2000, 122, 11729, describe the preparation of perfectly branched dendrimeric polycarbonates by reaction of carbonylbisimidazole as phosgene analogue with bishydroxyethylamino-2-propanol. Syntheses leading to perfect dendrimers are multistage and therefore cost-intensive and poorly suited to industrial scaleup.

D. H. Bolton and K. L. Wooley, in Macromolecules 1997, 30, 1890, describe the preparation of high molecular mass, high-rigidity hyper-branched aromatic polycarbonates by reaction of 1,1,1-tris(4-hydroxyphenyl)ethane with carbonylbisimidazole.

Hyper-branched polycarbonates can also be prepared in accordance with WO 98/50453, which describes a process of reacting triols again with carbonylbisimidazole. The initial products are imidazolides, which then undergo further, intermolecular reaction to form the polycarbonates. The method specified yields the polycarbonates as colorless or pale yellow, rubberlike products.

The aforementioned syntheses leading to highly or hyper-branched polycarbonates have the following drawbacks:
a) the hyper-branched products are either high-melting or else rubberlike, thereby significantly restricting their subsequent usefulness.
b) imidazole liberated during the reaction must be removed from the reaction mixture, which is a complex operation.
c) the reaction products in every case contain terminal imidazolide groups. These groups are labile and must be converted in a subsequent step, into hydroxyl groups for example.
d) carbonyldiimidazole is a comparatively expensive chemical, which greatly increases the feedstock costs.

It is an object of the present invention to provide a technically simple and cost-effective process to obtain aromatic, preferably aromatic/aliphatic and particularly preferably aliphatic high-functionality highly branched polycarbonates whose structures are readily adaptable to the requirements of the application and whose defined construction allows them to combine advantageous properties, such as high functionality, high reactivity, low viscosity, and ready solubility, and also to provide a process for preparing these high-functionality highly or hyper-branched polycarbonates.

We have found that this object is achieved by reaction of dialkyl or diaryl carbonates with dihydric or polyhydric aliphatic or aromatic alcohols.

In one alternative embodiment of the invention, phosgene, diphosgene or triphosgene is used as starting material instead of the carbonates.

The invention accordingly provides a process for preparing high-functionality highly or hyper-branched polycarbonates, comprising at least the following steps:
a) preparation of one or more condensation products (K) by
   aa) reaction of at least one organic carbonate (A) of the formula $RO[(CO)O]_nR$ with at least one at least trihydric aliphatic, aromatic/allphatic or aromatic alcohol (B) with elimination of alcohols ROH, each R independently at each occurrence being a straight-chain or branched aliphatic, aromatic/allphatic or aromatic hydrocarbon radical having 1 to 20 carbon atoms, and it also being possible for the radicals R to be joined to one another to form a ring, and n being an integer between 1 and 5,
   or
   ab) reaction of phosgene, diphosgene or triphosgene with the said aliphatic or aromatic alcohol (B) with elimination of hydrogen chloride,
   and also
b) intermolecular reaction of the condensation products (K) to form a high-functionality highly or hyper-branched polycarbonate,
   the proportion of OH groups to phosgenes or carbonates in the reaction mixture being selected such that the condensation products (K) contain on average either one carbonate or carbamoyl chloride group and more than one OH group or one OH group and more than one carbonate or carbamoyl chloride group.

The invention further provides the high-functionality highly or hyper-branched polycarbonates prepared by this process.

Hyper-branched polycarbonates for the purposes of this invention are noncrosslinked macromolecules containing hydroxyl and carbonate or carbamoyl chloride groups, said macromolecules having both structural and molecular non-uniformity. On the one hand, starting from a central molecule, they can have a construction analogous to that of dendrimers, but with the chain length of the branches being nonuniform. On the other hand they can also be linear in construction, with functional side groups, or else may have both linear and branched moieties, as a combination of the two extremes. On the definition of dendrimeric and hyper-branched polymers see also P. J. Flory, J. Am. Chem. Soc. 1952, 74, 2718 and H. Frey et al., Chem. Eur. J. 2000, 6, No. 14, 2499.

By hyper-branched in the context of the present invention is meant that the degree of branching (DB), which is to say the average number of dendritic links plus the average number of end groups per molecule, is from 10 to 99.9%, preferably from 20 to 99%, more preferably 20-95%. By dendrimeric in the context of the present invention is meant that the degree of branching is 99.9-100%. On the definition of degree of branching see H. Frey et at., Acta Polym. 1997, 48, 30.

The invention further provides for the use of the high-functionality highly branched polycarbonates of the invention as adhesion promoters or thixotropic agents or as building blocks for preparing polyaddition or polycondensation polymers: paints, coatings, adhesives, sealants, casting elastomers or foams, for example.

Details of the invention now follow:

As starting material it is possible to use phosgene, diphosgene or triphosgene; preferably, however, organic carbonates (A) are used.

The radicals R in the organic carbonates (A) of the formula RO[(CO)O]$_n$R that are used as a starting material are each independently at each occurrence a straight-chain or branched aliphatic, aromatic/aliphatic or aromatic hydrocarbon radical having 1 to 20 carbon atoms. The two radicals R may also be joined to one another to form a ring. R is preferably an aliphatic hydrocarbon radical and more preferably a straight-chain or branched alkyl radical having 1 to 5 carbon atoms or a substituted or unsubstituted phenyl radical.

The carbonates can be, preferably, simple carbonates of the general formula RO(CO)O, i.e., in this case, n is 1.

Generally speaking n is an integer between 1 and 5, preferably between 1 and 3.

Dialkyl or diaryl carbonates can be prepared, for example, from the reaction of aliphatic, araliphatic or aromatic alcohols, preferably monoalcohols, with phosgene. They may also be prepared by oxidative carbonylation of alcohols or phenols by means of CO in the presence of noble metals, oxygen or NO$_x$. On preparation methods for diaryl or dialkyl carbonates see also Ullmann's Encyclopedia of Industrial Chemistry, 6th Edition, 2000 Electronic Release, Wiley-VCH.

Examples of suitable carbonates include aliphatic, aromatic/aliphatic and aromatic carbonates, such as ethylene carbonate, 1,2- or 1,3-propylene carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, and didodecyl carbonate.

Examples of carbonates in which n is greater than 1 comprise dialkyl dicarbonates, such as di-tert-butyl dicarbonate, or dialkyl tricarbonates such as di-tert-butyl tricarbonate.

Preference is given to using aliphatic carbonates, particularly those in which the radicals contain 1 to 5 carbon atoms, such as dimethyl carbonate, diethyl carbonate, dipropyl carbonate, dibutyl carbonate or diisobutyl carbonate or diphenyl carbonate as aromatic carbonate, for example.

The organic carbonates are reacted with at least one at least trihydric aliphatic or aromatic alcohol (B) or with mixtures of two or more different alcohols.

Examples of compounds containing at least 3 OH groups include glycerol, trimethylolmethane, trimethylolethane, trimethylolpropane, 1,2,4-butanetriol, tris(hydroxymethyl) amine, tris(hydroxyethyl)amine, tris(hydroxypropyl)amine, pentaerythritol, diglycerol, triglycerol, polyglycols, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-trls(4'-hydroxyphenyl)methane, 1,1,1-tris(4'-hydroxy-phenyl)ethane, sugars, such as glucose, sugar derivatives, trifunctional or higher polyfunctional polyetherols based on trihydric or higher polyhydric alcohols and ethylene oxide, propylene oxide or butylene oxide or mixtures thereof, or polyesterols. Of these, glycerol, trimethylolethane, trimethylolpropane, 1,2,4butanetriol, and pentaerythritol, and also their polyetherols based on ethylene oxide or propylene oxide, are particularly preferred.

The polyfunctional alcohols can also be used in a mixture with difunctional alcohols (B'), with the proviso that the average OH functionality of all of the alcohols used is together more than 2. Examples of suitable dihydric compounds include ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxybiphenyl, bis(4-hydroxyphenyl)sulfide, bis(4-hydroxyphenyl)sulfone, bis(hydroxymethyl)benzene, bis(hydroxymethyl)toluene, bis(phydroxyphenyl)methane, bis(p-hydroxyphenyl)ethane, 2,2-bis(p-hydroxyphenyl)propane, 1,1-bis(p-hydroxy-phenyl)cyclohexane, dihydroxybenzophenone, difunctional polyether polyols based on ethylene oxide, propylene oxide, butylene oxide or mixtures thereof, polytetrahydrofuran, polycaprolactone or polyesterols based on diols and dicarboxylic acids.

The diols serve to fine-tune the properties of the polycarbonate. If difunctional alcohols are employed, the proportion of difunctional alcohols (B') to the at least trifunctional alcohols (B) is set by the skilled worker in accordance with the desired properties of the polycarbonate. As a general rule the amount of the alcohol or alcohols (B') is 0 to 39.9 mol % with respect to the total amount of all the alcohols (B) and (B') together. The amount is preferably 0 to 35 mol %, more preferably 0 to 25 mol %, and very preferably 0 to 10mol %.

The reaction of phosgene, diphosgene or triphosgene with the alcohol or alcohol mixture takes place in general with elimination of hydrogen chloride; the reaction of the carbonates with the alcohol or mixture of alcohols to form the high-functionality highly branched polycarbonate of the invention takes place with elimination of the monofunctional alcohol or phenol from the carbonate molecule.

After the reaction, i.e., without further modification, the high-functionality highly branched polycarbonates formed by the process of the invention are terminated with hydroxyl and/or carbonate or carbamoyl chloride groups. They are readily soluble in a variety of solvents: for example, in water, alcohols, such as methanol, ethanol, and butanol, in alcohol/water mixtures, in acetone, 2-butanone, ethyl acetate, butyl acetate, methoxypropyl acetate, methoxyethyl acetate, tetrahydrofuran, dimethylformamide, dimethylacetamide, N-methylpyrrolidone, and in ethylene carbonate or propylene carbonate.

A high-functionality polycarbonate for the purposes of this invention is a product which in addition to the carbonate groups forming the polymer framework possesses, terminally or laterally, at least three, preferably at least six, and more preferably at least ten further functional groups. The functional groups are carbonate or carbamoyl chloride groups and/or OH groups. In principle there is no upper limit on the number of terminal or lateral functional groups, although products with a very high number of functional groups may have unwanted properties, such as high viscosity or poor solubility, for example. The number of terminal or lateral functional groups in the high-functionality polycarbonates of the present invention is generally not more than 500, preferably not more than 100.

When preparing the high-functionality polycarbonates the ratio of OH-containing compounds to phosgene or carbonate must be set such that the simplest resulting condensation product (condensation product (K) below) contains on average either one carbonate or carbamoyl chloride group and more than one OH group or else one OH group and more than one carbonate or carbamoyl chloride group.

The simplest structure of the condensation product (K) illustrated in the example of the reaction of a carbonate (A) with a diol or polyol (B) produces the arrangement $XY_m$ or $Y_mX$, where X is a carbonate group, Y is a hydroxyl group, and m is generally an integer between 1 and 6, preferably between 1 and 4, and very preferably between 1 and 3. The reactive group, which is the sole resultant group in this case, is generally referred to below as the "focal group".

If, for example, in the preparation of the simplest condensation product (K) from the carbonate and a dihydric alcohol the reaction ratio is 1:1, the result is on average a molecule of the type XY, illustrated by the formula 1.

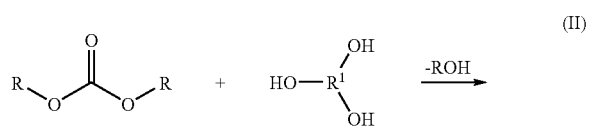

(I)

In the case of the preparation of the condensation product (K) from a carbonate and from a trihydric alcohol with a reaction ratio 1:1 the result on average is a molecule of type $XY_2$, illustrated by the formula 2. The focal group in this case is a carbonate group.

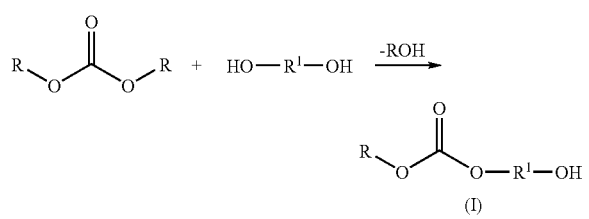

(II)

-continued

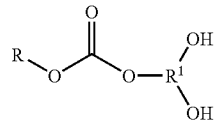

In the preparation of the condensation product (K) from a carbonate and a tetrahydric alcohol, again with a reaction ratio of 1:1, the result is on average a molecule of type $XY_3$, illustrated by the formula 3. The focal group in this case is a carbonate group.

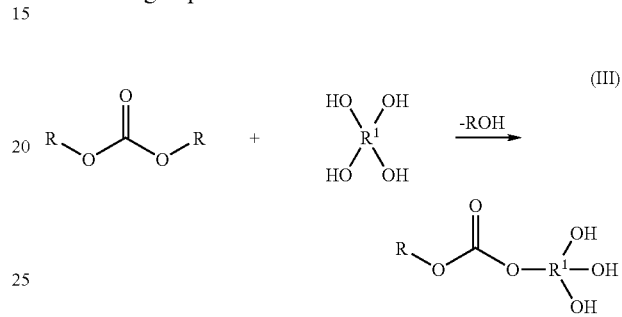

(III)

In formulae 1 to 3 R is as defined at the outset and $R^1$ is an aliphatic or aromatic radical.

Additionally, the condensation product (K) can be prepared, for example from a carbonate and a trihydric alcohol, illustrated by the formula 4, with the molar reaction ratio being 2:1. In this case the result on average is a molecule of type $X_2Y$ and the focal group is an OH group. In formula 4 R and $R^1$ are as defined for formulae 1 to 3.

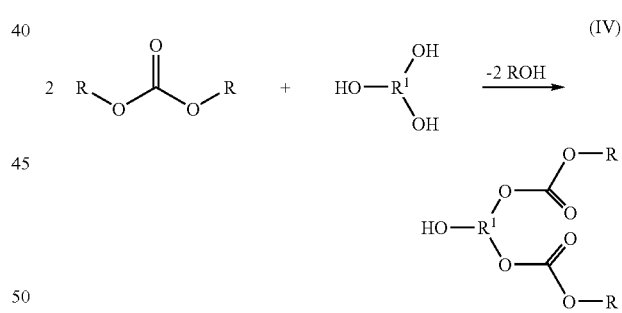

(IV)

If difunctional compounds, e.g. a dicarbonate or a diol, are added additionally to the components, the result is an extension of the chains, as illustrated for example in formula 5. The result is again on average a molecule of the $XY_2$, the focal group being a carbonate group.

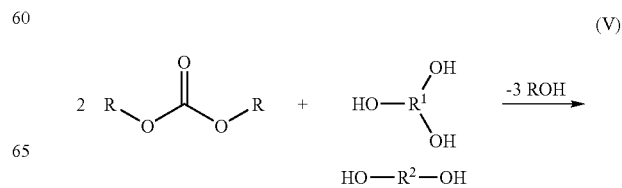

(V)

-continued

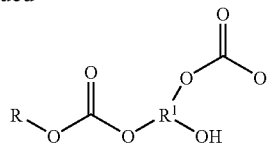

In formula 5 $R^2$ is an aliphatic or aromatic radical, and R and $R^1$ are as defined above.

It is also possible to use two or more condensation products (K) for the synthesis. In this case it is possible on the one hand to use two or more alcohols and/or two or more carbonates. Furthermore, through the choice of the proportion of the alcohols and the carbonates employed, and/or of the phosgenes, it is possible to obtain mixtures of different condensation products with different structure. This may be illustrated exemplarily using as an example the reaction of a carbonate with a trihydric alcohol. If the starting products are employed in a 1:1 ratio, as depicted in (II), the product is a molecule $XY_2$. If the starting products are employed in a 2:1 ratio, as depicted in (IV), the product is a molecule $X_2Y$. With a ratio between 1:1 and 2:1 a mixture of molecules $XY_2$ and $X_2Y$ is obtained.

The simple condensation products (K) described by way of example in formulae 1-5 preferably undergo intermolecular reaction in accordance with the invention to form high-functionality polycondensation products, referred to below as polycondensation products (P). The reaction giving condensation product (K) and giving polycondensation product (P) takes place customarily at a temperature of from 0 to 250° C., preferably from 0 to 250° C., particularly preferably from 60 to 200° C. and very particularly preferably at from 60 to 160° C., in absence of solvent or in solution. In this case it is generally possible to use any solvents which are inert toward the particular reactants. Preference is given to using organic solvents, such as decane, dodecane, benzene, toluene, chlorobenzene, xylene, dimethylformamide, dimethylacetamide or solvent naphtha, for example.

In one preferred embodiment the condensation reaction is conducted in absence of solvent. The phenol ROH or the monofunctional alcohol liberated during the reaction can be removed from the reaction equilibrium for example by distillation, where appropriate under reduced pressure, in order to accelerate the reaction.

If distillative removal is envisaged, it is generally advisable to use carbonates which, in the reaction, liberate alcohols or phenols ROH having a boiling point of less than 140° C. at the prevailing pressure.

To accelerate the reaction it is also possible to add catalysts or mixtures of catalysts. Suitable catalysts are compounds which catalyze the esterification or transesterification reactions, examples being alkali metal hydroxides, alkali metal carbonates, alkali metal hydrogen carbonates, preferably those of sodium, potassium or cesium, tertiary amines, guanidines, ammonium compounds, phosphonium compounds, organoaluminum, organotin, organozinc, organoitanium, organozirconium or organobismuth compounds, and also what are called double metal cyanide (DMC) catalysts, as described for example in DE 10138216 or in DE 10147712.

Preference is given to using potassium hydroxide, potassium carbonate, potassium hydrogencarbonate, diazabicyc-dootane (DABCO), diazabicyclononene (DBN), diazabicyclloundecene (DBU), imidazoles, such as imidazole, 1-methylimidazole or 1,2-dimethylimidazole,titanium tetrabutoxide, titanium tetraisopropoxide, dibutyltin oxide, dibutyltin dilaurate, tin dioctoate, zirconium acetylacetonate or mixtures thereof.

The catalyst is added generally in an amount of from 50 to 10000 ppm by weight, preferably from 100 to 5000 ppm by weight, based on the amount of alcohol or alcohol mixture employed.

A further possibility is to control the intermolecular polycondensation reaction not only by adding the appropriate catalyst but also by selecting an appropriate temperature. The composition of the starting components and the residence time provide additional means of setting the average molecular weight of the polymer (P).

The condensation products (K) and the polycondensation products (P), which have been prepared at elevated temperature, are normally stable for a relatively long period to time at room temperature.

In view of the nature of the condensation products (K) it is possible for the condensation reaction to result in polycondensation products (P) having different structures, with branches but no crosslinks. Furthermore, ideally, the polycondensation products (P) contain either a carbonate or carbamoyl chloride focal group and more than two OH groups or else an OH focal group and more than two carbonate or carbamoyl chloride groups. The number of reactive groups is a function of the nature of the condensation products (K) employed and the degree of polycondensation.

By way of example, a condensation product (K) of formula 2 is able to react by threefold intermolecular condensation to form two different polycondensation products (P), represented in the formulae 6 and 7.

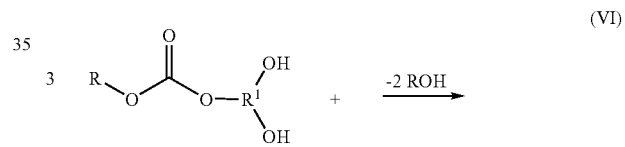

(VI)

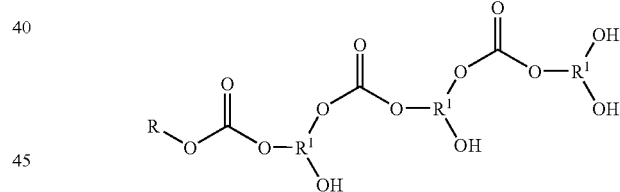

(VII)

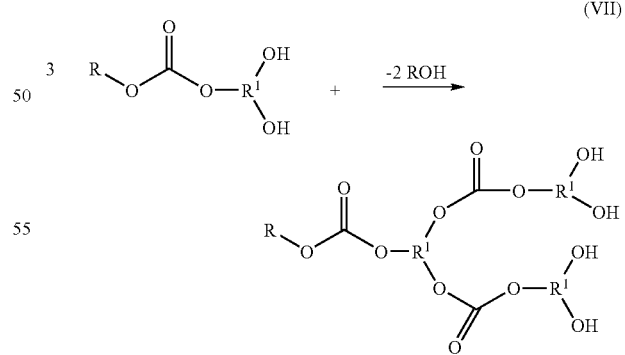

In formulae 6 and 7 R and $R^1$ are as defined above.

To terminate the intermolecular polycondensation reaction there are a variety of options. For example, the temperature can be lowered to a range in which the reaction comes to a standstill and the product (K) or polycondensation product (P) is stable on storage.

Furthermore, the catalyst can be deactivated: in the case of basic catalysts, by adding an acidic component, for example, a Lewis acid or an organic or inorganic protonic acid, for example.

In a further embodiment, as soon as the intermolecular reaction of the condensation product (K) has produced a polycondensation product (P) having the desired degree of polycondensation, the reaction can be terminated by adding to the product (P) a product containing groups that are reactive with the focal group of (P). For example, with a carbonate focal group, a monoamine, diamine or polyamine can be added. In the case of a hydroxyl focal group, a mono-, di- or polyisocyanate, an epoxy-functional compound, or an acid derivative which is reactive with OH groups can be added to the product (P) for example.

Preparation of the high-functionality polycarbonates of the invention takes place generally within a pressure range from 0.1 mbar to 20 bar, preferably from 1 mbar to 5 bar, in reactors or reactor cascades which are operated batchwise, semibatch or continuously.

As a result of the abovementioned setting of the reaction conditions and, where appropriate, through the choice of appropriate solvent it is possible to pass on the products of the invention, following their preparation, for further processing without additional purification.

In a further preferred embodiment the product is stripped, i.e., freed from volatile compounds of low molecular mass. This can be done by optionally deactivating the catalyst when the desired degree of conversion has been reached, and removing the low molecular mass volatiles, such as monoalcohols, phenols, carbonates, hydrogen chloride or highly volatile oligomeric or cyclic compounds, by distillation, if appropriate with introduction of a gas, preferably nitrogen, carbon dioxide or air, and if appropriate under reduced pressure.

In another preferred embodiment the polycarbonates of the invention may acquire functional groups in addition to those already acquired through the reaction. This functionalization may take place in the course of molecular weight buildup or else subsequently, i.e., after the end of the actual polycondensation.

If, prior to or during molecular weight buildup, components are added which possess functional elements or functional groups other than hydroxyl or carbonate groups, then the result is a polycarbonate polymer containing randomly distributed functionalities other than the carbonate, carbamoyl chloride or hydroxyl groups.

Effects of this kind can be obtained, for example, by adding compounds, during the polycondensation, which in addition to hydroxyl, carbonate or carbanoyl chloride groups contain further functional groups or functional elements, such as mercapto groups, primary, secondary or tertiary amino groups, ether groups, carboxylic acid groups or derivatives thereof, sulfonic acid groups or derivatives thereof, phosphonic acid groups or derivatives thereof, silane groups, siloxane groups, aryl radicals or long-chain alkyl radicals. Modification by means of carbamate groups, for example, can be done using ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl) amino-methane, tris(hydroxyethyl)aminomethane, ethylenediamine, propylenediamine, hexamethylenediamine or isophoronediamine.

For modification with mercapto groups it is possible to use mercaptoethanol for example. Tertiary amino groups can be produced, for example, by incorporation of triethanolamine, tripropanolamine, N-methyldiethanolamine, N-methyldipropanolamine or N,N-dimethylethanolamine, Ether groups can be generated, for example, by incorporating difunctional or higher polyfunctional polyetherols by condensation. By adding dicarboxylic acids, tricarboxylic acids, dicarboxylic esters, such as dimethyl terephthalate or tricarboxylic esters, it is possible to produce ester groups. By reaction with long-chain alkanols or alkanediols it is possible to introduce long-chain alkyl radicals. The reaction with alkyl or aryl diisocyanates generates polycarbonates containing alky, aryl, and urethane groups; the addition of primary or secondary amines leads to the introduction of urethane groups or urea groups.

Subsequent functionalization can be obtained by reacting the resultant high-functionality highly or hyper-branched polycarbonate in an additional step of the process (step c)) with a suitable functionalizing reagent able to react with the OH and/or carbonate or carbamoyl chloride groups of the polycarbonate.

Hydroxyl-containing, high-functionality highly or hyper-branched polycarbonates can be modified, for example, by adding molecules containing acid groups or isocyanate groups. Polycarbonates containing acid groups, for example, are obtainable by reaction with compounds containing anhydride groups.

Moreover, hydroxy-containing, high-functionality polycarbonates can also be converted into high-functionality polycarbonate-polyether polyols by reaction with alkylene oxides, such as ethylene oxide, propylene oxide or butylene oxide, for example.

One great advantage of the process of the invention is its economy. Not only the reaction forming a condensation product (K) or polycondensation product (P) but also the reaction of (K) or (P) to form polycarbonates having other functional groups or elements can be conducted in one reaction apparatus, which has technical and economic advantages.

The high-functionality highly or hyper-branched polycarbonates obtained in accordance with the process of the invention can be used, for example, as adhesion promoters or thixotropic agents or as building blocks for preparing polyaddition or polycondensation polymers, for example, as components for preparing paints, coatings, adhesives, sealants, casting elastomers or foams.

They are especially suitable for preparing printing inks, such as flexographic, gravure, offset or screen printing inks, and for preparing print varnishes. The polycarbonates of the invention are especially suitable for preparing low-viscosity printing inks, such as flexographic or gravure inks for printing packing. They can be used for different purposes in printing inks, but particularly as binders, either alone or in a mixture with other binders.

For this purpose the polycarbonates of the invention are formulated with suitable solvents, colorants, optionally further binders, and typical printing-inks additives. For further details on the formulation and preparation of printing inks with hyper-branched polymers reference is made expressly to WO 02/36695 and WO 02/36697, particularly to the comments in WO 02/36696, page 10 line 19 to page 15 line 14, and in WO 02/36697, page 7 line 14 to page 10 line 18, and the examples of said documents.

Printing inks comprising the polycarbonates of the invention feature a particularly effective and hitherto unknown adhesion to the substrates, particularly to metal foils and/or polymer films.

As a result the printing inks are also especially suitable for producing laminates of two or more polymer films and/or metal foils, in which one foil or film is printed with one or more layers of a printing ink and a second foil or film is laminated onto the printed layer. Composites of this kind are used, for example, to produce packaging.

The purpose of the examples which follow is to illustrate the present invention.

General Procedure:

The polyfunctional alcohol or the alcohol mixture, the carbonate, and other monomers where appropriate, and catalyst (250 ppm based on alcohol) were charged in the quantities detailed in Table 1 to a three-necked flask equipped with stirrer, reflux condenser, and internal thermometer, and the mixture was heated to 120° C., or to 140° C. in the case of the experiments labeled *, and stirred at this temperature for 2 h. As the reaction progressed the temperature of the reaction mixture fell as a result of the onset of evaporative cooling by the monoalcohol liberated. The reflux condenser was then replaced by a descending condenser, optionally (labeled by **) one equivalent of phosphoric acid, based on the equivalent amount of catalyst, was added, the monoalcohol was distilled off, and the temperature of the reaction mixture was slowly raised to 160° C.

In the case of the experiment labeled ** the pressure was additionally lowered to 8 mbar.

The alcohol removed by distillation was collected in a cooled round-bottomed flask and weighed, which allowed the conversion to be determined as a percentage of the theoretically possible complete conversion (see Table 1).

The reaction products were subsequently analyzed by gel permeation chromatography using dimethylacetamide as the noble phase and polymethyl methacrylate (PMMA) as standard.

TABLE 1

Reactants and end products

| Ex. No. | Alcohol | Carbonate or carbonate + other monomers | Molar ratio alcohol:carbonate | Catalyst | Distillate, amount of alcohol based on complete conversion mol % | Molecular weight product (g/mol) Mw Mn | Visc. 23° C. product (mPas) | OH number product (mg KOH/g) to DIN 53240, Part 2 |
|---|---|---|---|---|---|---|---|---|
| 1 | TMP | DMC | 1:1 | $K_2CO_3$ | 90 | 2150 / 1300 | 9960$^a$ | 583 |
| 2 | TMP | DMC | 1:2 | $K_2CO_3$ | 90 | 10500 / 3800 | 159000$^a$ | — |
| 3 | TMP × 1.2 EO | DMC | 1:2 | $K_2CO_3$ | 90 | 12500 / 3500 | 22100$^a$ | — |
| 4** | TMP × 3 EO | DECREASE | 1:1 | $K_2CO_3$ | 90 | 4100 / 2500 | 4020 | 310 |
| 5 | TMP × 3 EO | DEC | 1:1 | $K_2CO_3$ | 70 | 2900 / 1850 | 780 | 349 |
| 6 | TMP × 12 EO | DEC | 1:1 | $K_2CO_3$ | 70 | 4400 / 2500 | 550 | 180 |
| 7 | TMP × 12 EO | DEC | 1:1 | $K_2CO_3$ | 90 | 5500 / 2700 | 990 | 164 |
| 8*** | TMP × 12 EO | DEC | 1:1 | $K_2CO_3$ | 98 | 14700 / 5700 | 3500 | 145 |
| 9 | TMP × 1.2 PO | DEC | 1:1 | $K_2CO_3$ | 90 | 2800 / 1800 | 37000 | 436 |
| 10 | TMP × 1.2 PO | DEC | 1:1 | $K_2CO_3$ | 70 | 2100 / 1450 | 7220 | 461 |
| 11* | TMP × 5.4 PO | DEC | 1:1 | KOH | 70 | 7800 / 2500 | 1260 | 227 |
| 12** | Glyc × 5 EO | DEC | 1:1 | $K_2CO_3$ | 90 | 3900 / 2700 | 1160 | 295 |
| 13 | Glyc × 5 EO | DEC | 1:1 | $K_2CO_3$ | 70 | 3200 / 2200 | 470 | 307 |
| 14* | Glyc × 7.5 PO | DEC | 1:1 | KOH | 85 | 4200 / 2600 | 1340 | 225 |
| 15 | TMP × 1.2 EO + CHD 3:1 molar | DEC | 0.75:0.25:1 | $K_2CO_3$ | 90 | 3500 / 2100 | 64400 | 384 |
| 16 | TMP × 1.2 EO + CHDM 3:1 molar | DEC | 0.75:0.25:1 | $K_2CO_3$ | 90 | 3800 / 2200 | 76800 | 369 |
| 17 | THEA | DEC | 1:1 | $K_2CO_3$ | 90 | 1600 / 1100 | 13800 | 687 |
| 18 | TMP × 1.2 EO | DEC | 1:1 | $K_2CO_3$ | 70 | 2200 / 1500 | 3820 | 498 |
| 19 | TMP × 1.2 EO | DEC | 1:1 | $K_2CO_3$ | 90 | 4000 / 2200 | 73000 | 436 |
| 20 | TMP × 5.4 PO | DEC | 1:1.5 | KOH | n.d. | 130000 / 5700 | 5220$^b$ | 116 |
| 21 | TMP × 3 EO | DEC | 1:1.1 | $K_2CO_3$ | n.d. | 79000 / 5000 | 11200$^b$ | 219 |
| 22* | THEIC | DEC | 1:1 | KOH | 85 | 3800 / 900 | n.d. | 93 |
| 23* | TMP × 3 EO + Octadecanol 4:1 molar | DEC | 0.8:0.2:1 | $K_2CO_3$ | 85 | 12400 / 3000 | n.d. | 169 |

TABLE 1-continued

Reactants and end products

| Ex. No. | Alcohol | Carbonate or carbonate + other monomers | Molar ratio alcohol:carbonate | Catalyst | Distillate, amount of alcohol based on complete conversion mol % | Molecular weight product (g/mol) Mw Mn | Visc. 23° C. product (mPas) | OH number product (mg KOH/g) to DIN 53240, Part 2 |
|---|---|---|---|---|---|---|---|---|
| 24 | TMP × 1.2 PO | DEC + TDME | 1:0.8 DEC:0.2 TDME | $K_2CO_3$ | 80 | 5100 2200 | $11500^b$ | 329 |
| 25 | TMP × 1.2 PO | DEC + TDME | 1:0.6 DEC:0.4 TDME | $K_2CO_3$ | 80 | 8600 3200 | $33100^b$ | 281 |
| 26* | TMP × 1.2 PO + Hydroquinone 4:1 molar | DEC | 0.8:0.2:1 | $K_2CO_3$ | 80 | 3300 1400 | $26800^b$ | 380 |
| 27* | TMP × 3 EO + Bisphenol A 4:1 molar | DEC | 0.8:0.2:1 | $K_2CO_3$ | 97 | 1700 1050 | $4200^b$ | 390 |

Glyc = glycerol
TMP = trimethylolpropane
CHD = 1,4-cyclohexanediol
CHDM = 1,4-cyclohexanedimethanol
THEIC = tris(N-2-hydroxyethyl)isocyanurate
DMC = dimethyl carbonate
DEC = diethyl carbonate
EO = ethylene oxide
PO = propylene oxide
THEA = tris(hydroxyethyl)amine
TDME = dimethyl terephthalate
Bisphenol A = 2,2-bis(p-hydroxyphenyl)propane
DPC = diphenyl carbonate
$^a$= viscosity measured on product in 90% form in butyl acetate
$^b$= viscosity measured on product in 90% form in ethyl acetate
n.d. = not determined Printing Inks with the Highly or Hyper-branched Polycarbonates of the Invention The quality of the printing inks of the invention was determined on the basis of the strength of their adhesion to a variety of print media.

Tesa-strength Measurement Method

The "Tesa-strength" test method is used to determine the adhesion of a printing ink film to the print medium.

Sample Preparation

The ink, diluted to printing viscosity, is pressed onto the prescribed print medium or drawn down using a 8 μm doctor blade.

Test Procedure

A strip of Tesa tape (adhesive tape with a width of 19 mm (article code BDF 4104 from Beiersdorf AG)) is stuck onto the printing ink film, pressed down evenly, and pulled off again after 10 seconds. This operation is repeated 4 times at the same side on the test specimen, in each case using a new strip of tape. Each strip of tape is stuck in succession onto a piece of white paper, or to black paper in the case of white inks. Testing is carried out immediately following application of the ink.

Evaluation

A visual examination is made of the surface of the test specimen for damage. Scoring is from 1 (very poor) to 5 (very good).

For the examples the following formulations (in parts by weight) were selected:

Standard Formulation A (Comparative)
70.0 pigment preparation (BASF Drucksysteme)
8.0 nitrocellulose (Wolf)
1.0 oleamide (Croda)
0.5 PE waxes (BASF AG)
2.0 dibutyl phthalate (Brenntag)
12.5 ethanol
6.0 conventional polyurethane PUR 7317 (BASF)

Formulation 1 (Inventive)
0.0 pigment preparation (BASF Drucksysteme)
8.0 nitrocellulose (Wolf)
1.0 oleamide (Croda)
0.5 PE waxes (BASF AG)
2.0 dibutyl phthalate (Brenntag)
12.5 ethanol
6.0 polymer from Example 4 (Table 1), as 75% strength solution in ethanol

TABLE 2

Standard binder in comparison with polymer from Example 5 (Table 1)

| | | Print medium (film) | |
|---|---|---|---|
| Example | System | Polypropylene | Polyamide Emblem 1500 |
| 28 (comparative) | Standard formulation A | 1 | 1 |
| 29 (inventive) | Formulation 1 | 4 | 5 |

Determining the Composite Strength of Laminates:

To produce laminated packaging, printed polymer films, e.g., polyamide, polyethylene or polypropylene films, are laminated to other types of film or foil, such as metal foils or else polymer films, for example. Important performance properties of such laminates for use as laminated packaging include not only the strength of the composite under normal storage conditions but also its strength under harsh conditions, such as during heating or sterilization, for example.

The quality of the printing inks of the invention was assessed by determining the composite strength. By composite strength is meant the determination of the bond adhesion between two films or metal foils joined by lamination or extrusion.

Measuring and Testing Equipment:
    Tensile strength tester from Zwick
    Punch (width: 15mm)

Sample Preparation:
    In each case at least 2 strips (width: 15 mm) of the material under test must be cut longitudinally and transversally with respect to the film web. In order to separate the composite the ends of the punched strips can be immersed in a suitable solvent (e.g., 2-bu-tanone) until the materials part from one another. Thereafter the specimen must be carefully dried again.

Test Procedure:
    The delaminated ends of the test specimens are clamped into the tensile strength tester. The less stretchable film should be placed in the upper clamp. When the machine is started, the end of the specimen should be held at right angles to the direction of tension, thereby ensuring constant tension. The takeoff speed is 100 mm/min and the angle of takeoff of the separated films with respect to the unseparated composite is 90°.

Evaluation:
    The composite strength figure is read off as an average, and reported in N/15 mm.

Sample Preparation:
    Following dilution to printing viscosity the ink is pressed onto the prescribed print medium—polyamide (Emblem 1500)—or drawn down using a 6 µm doctor blade. In parallel with this the polyethylene laminating film is coated with the adhesive/hardener mixture Morfree A415 (adhesive) and C90 (hardener, Rohm & Haas) in a mixing ratio of 100:40 by weight, with coating giving a film thickness of approximately 6 µm (corresponding to about 2.5 g/m$^2$). The two films are subsequently pressed together so that the printing ink and the adhesive come into contact. After being pressed together the composite films are stored at 60° C. for 5 days.

The following formulations (parts by weight) were selected for the examples:

Standard Formulation B (Comparative):
13.0 pigment Heliogen Blue D 7080 (BASF AG)
15.0 binder (polyvinyl butyral)
3.0 additive (polyethyleneimine, BASF AG)
69.0 ethanol Formulation 1 (Inventive):
70.0 pigment preparation (BASF Drucksysteme)
8.0 nitrocellulose (Wolf)
1.0 oleamide (Croda)
0.5 PE waxes (BASF AG)
2.0 dibutyl phthalate (Brenntag)
12.5 ethanol
6.0 polymer from Example 4 (Table 1), as a 75% solution in ethanol

EXAMPLE 30

Composite Strengths for the Polyamide/Polyethylene Laminate

|  | Composite strength (N/15 mm) |
| --- | --- |
| Standard system B (comparative) | 4.19 |
| Formulation 1 (inventive) | 8.90 |

We claim:

1. A process for preparing a high-functionality highly or hyper-branched polycarbonate having a degree of branching of from 10 to 99.9%, comprising at least the following steps:
   a) preparation of one or more condensation products (K) by reaction of at least one organic carbonate (A) of the formula RO[(CO)O]$_n$R with at least one at least trihydric aliphatic, one at least trihydric aromatic/aliphatic or one at least trihydric aromatic alcohol (B) with elimination of alcohols ROH, each R independently at each occurrence being a straight-chain or branched aliphatic, aromatic/aliphatic or aromatic hydrocarbon radical having 1 to 20 carbon atoms, and it also being possible for the radicals R to be joined to one another to form a ring, and n being an integer between 1 and 5, and
   b) intermolecular reaction of the condensation products (K) to form a high-functionality highly or hyper-branched polycarbonate,
   the alcohols (B) being trifunctional or higher polyfunctional polyetherols based on alcohols with a functionality of three or more and on ethylene oxide, propylene oxide or butylene oxide or mixtures thereof, and
   the proportion of OH groups to phosgenes or carbonates in the reaction mixture being selected such that the condensation products (K) comprise on average one carbonate group and more than one OH group or one OH group and more than one carbonate group and the reaction being carried out in the presence of at least one suitable catalyst.

2. The process according to claim 1, wherein the reaction mixture further comprises at least one dihydric aliphatic or aromatic alcohol (B'), with the proviso that the average OH functionality of all of the alcohols used is together greater than 2.

3. The process according to claim 1, wherein R is a straight-chain or branched alkyl radical having 1 to 5 carbon atoms.

4. The process according to claim 1, wherein n is an integer of from 1 to 3.

5. The process according to claim 1, wherein the organic carbonate (A) is at least one selected from the group consisting of dimethyl carbonate, diethyl carbonate, dipropyl carbonate, dibutyl carbonate, diisobutyl carbonate, ethylene carbonate, propylene carbonate, diphenyl carbonate, and di(tert-butyl)tricarbonate.

6. The process according to claim 1, wherein the at least trihydric alcohol (B) is at least one selected from the group consisting of polyetherols based on ethylene oxide and/or propylene oxide of glycerol, trimethylolethane, trimethylolpropane, 1,2,4-butanetriol or pentaerythritol.

7. The process according to claim 1, wherein the resultant alcohols ROH are removed from the reaction mixture.

8. The process according to claim 1, wherein the reaction is conducted under reduced pressure.

9. The process according to claim 1, wherein the catalyst is at least one selected from the group consisting of potassium hydroxide, potassium carbonate, potassium hydrogencarbonate, diazabicyclooctane (DABCO), diazabicyclononene (DBN), diazabicycloundecene (DBU), imidazole, 1-methylimidazole, 1,2-dimethylimidazole, titanium tetrabutoxide, titanium tetraisopropoxide, dibutyltin oxide, dibutyltin dilaurate, tin dioctoate and zirconium acetylacetonate.

10. The process according to claim 1, wherein the high-functionality highly or hyper-branched polycarbonate obtained is reacted in an additional step (step c)) with a suitable functionalizing reagent able to react with the OH and/or carbonate or groups of the polycarbonate.

11. The process according to claim 1, wherein the high-functionality highly or hyper-branched polycarbonate is modified by conducting step b) in the presence of additional compounds having functional elements or further functional groups in addition to OH or carbonate groups.

12. A high-functionality highly or hyper-branched polycarbonate comprising at least 3 functional groups and having a degree of branching of from 10 to 99.9% and obtainable by a process according to claim 1.

13. The polycarbonate according to claim 11, wherein the degree of branching is from 20 to 95% and which has at least 10 functional groups.

14. The method of preparing polyaddition or polycondensation polymers comprising adding the polycarbonate according to claim 12 as an adhesion promoter or thixotropic agent or as a building block.

15. The method of preparing paints, coatings, adhesives, sealants, casting elastomers or foams comprising adding the polycarbonate of claim 12.

16. The method of preparing printing inks or print varnishes comprising adding the polycarbonate of claim 12.

17. The method according to claim 16, wherein the printing inks are packaging inks.

18. The method of producing laminates of two or more polymer films and/or metal foils, one film or foil being printed with one or more layers of a printing ink comprising the polycarbonate of claim 12, and a second film or foil being laminated onto the printed layer.

19. The process according to claim 2, wherein R is a straight-chain or branched alkyl radical having 1 to 5 carbon atoms.

20. The process according to claim 2, wherein n is an integer of from 1 to 3.

* * * * *